Jan. 13, 1942.　　　P. KETELSEN　　　2,269,770
GRAIN SHOCKER
Filed Oct. 21, 1939　　　12 Sheets-Sheet 1

INVENTOR
Peter Ketelsen
BY
Arthur Le Brown
ATTORNEY

Jan. 13, 1942.        P. KETELSEN        2,269,770
                      GRAIN SHOCKER
              Filed Oct. 21, 1939        12 Sheets-Sheet 3

INVENTOR
Peter Ketelsen.
BY
Arthur C. Brown
ATTORNEY

Jan. 13, 1942.　　　P. KETELSEN　　　2,269,770
GRAIN SHOCKER
Filed Oct. 21, 1939　　　12 Sheets-Sheet 4

Fig. 5.

INVENTOR
*Peter Ketelsen.*
BY
*Arthur C. Brown*
ATTORNEY

Jan. 13, 1942.　　　　P. KETELSEN　　　　2,269,770
GRAIN SHOCKER
Filed Oct. 21, 1939　　　12 Sheets-Sheet 5

INVENTOR
Peter Ketelsen.
BY
Arthur C. Brown
ATTORNEY

Jan. 13, 1942. P. KETELSEN 2,269,770
GRAIN SHOCKER
Filed Oct. 21, 1939 12 Sheets-Sheet 6

INVENTOR
Peter Ketelsen.
BY
Arthur C. Brown
ATTORNEY

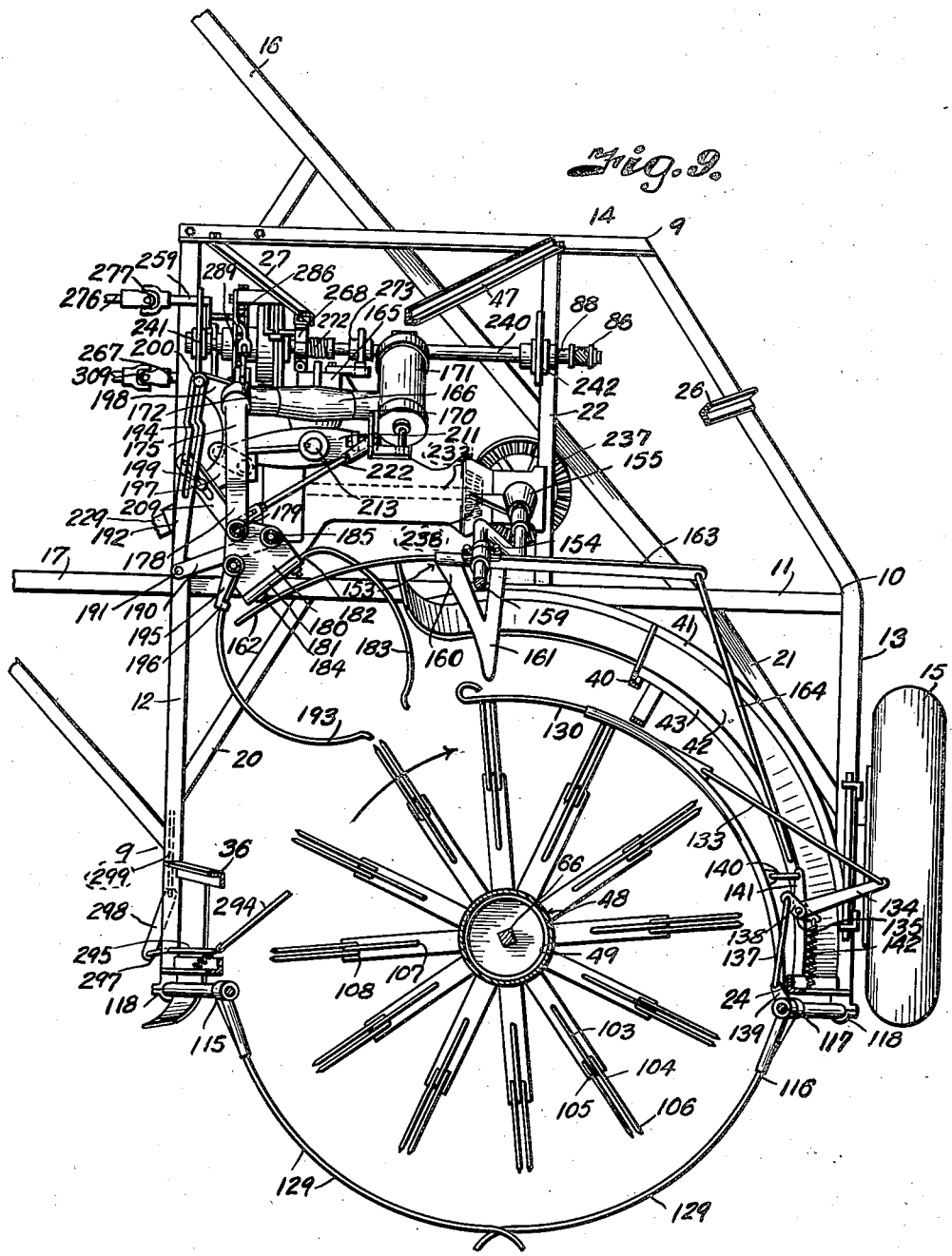

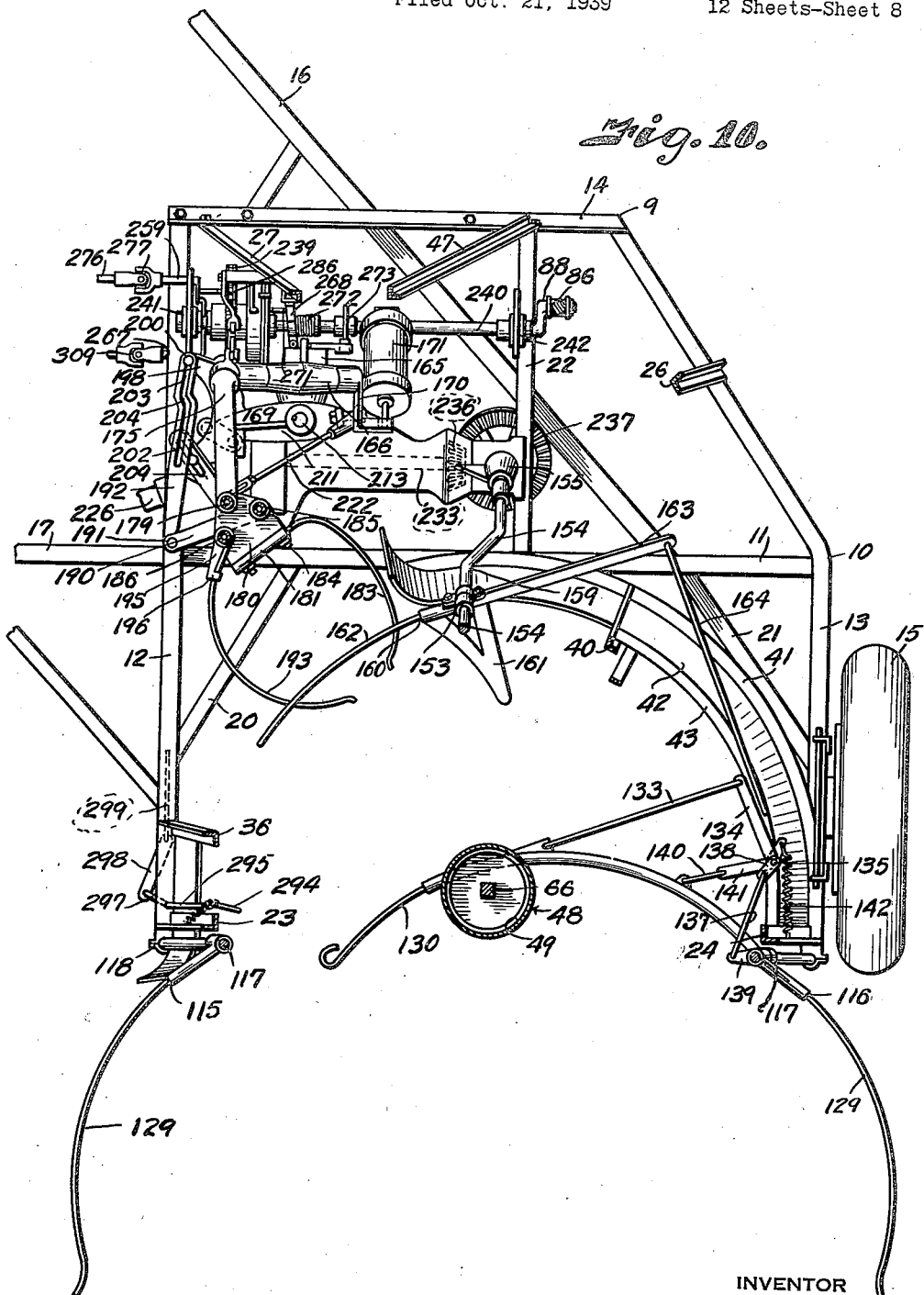

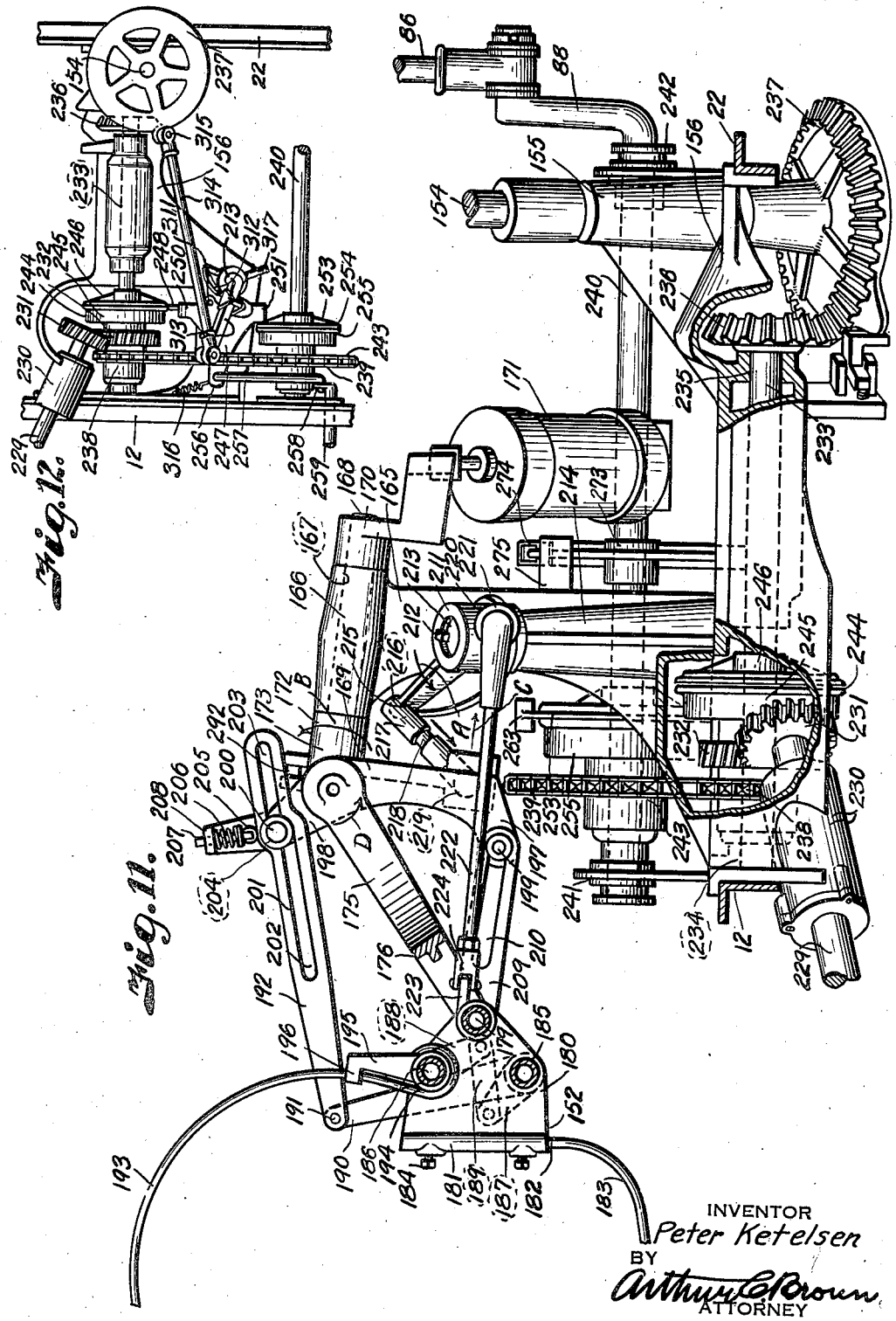

Jan. 13, 1942.　　　　　P. KETELSEN　　　　　2,269,770
GRAIN SHOCKER
Filed Oct. 21, 1939　　　　12 Sheets-Sheet 10

INVENTOR
Peter Ketelsen.
BY
Arthur L. Brown
ATTORNEY

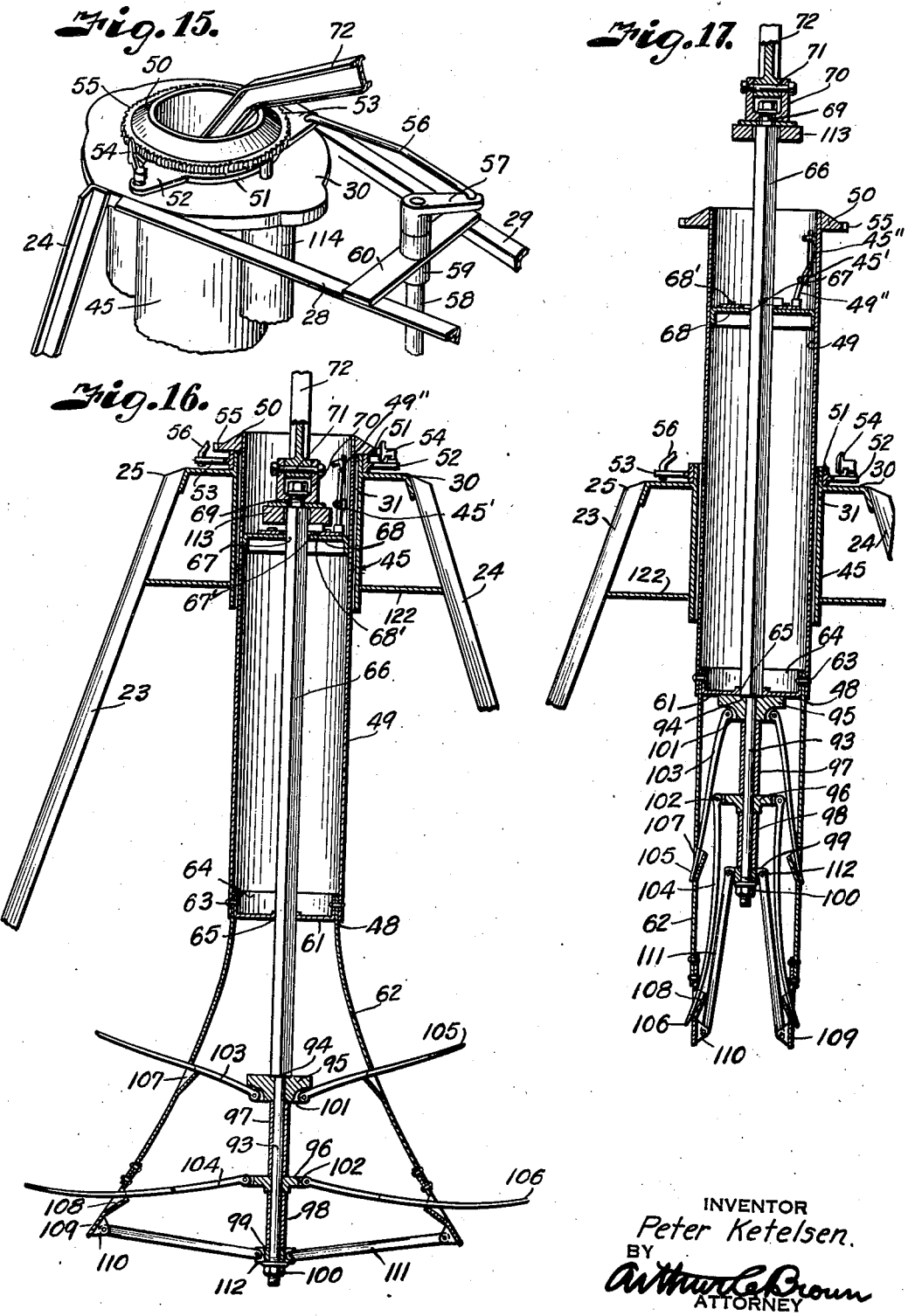

Jan. 13, 1942.  P. KETELSEN  2,269,770
GRAIN SHOCKER
Filed Oct. 21, 1939  12 Sheets-Sheet 12
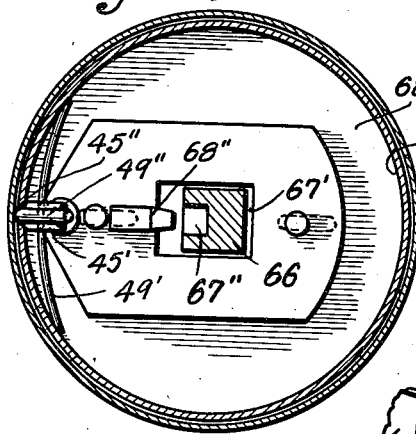
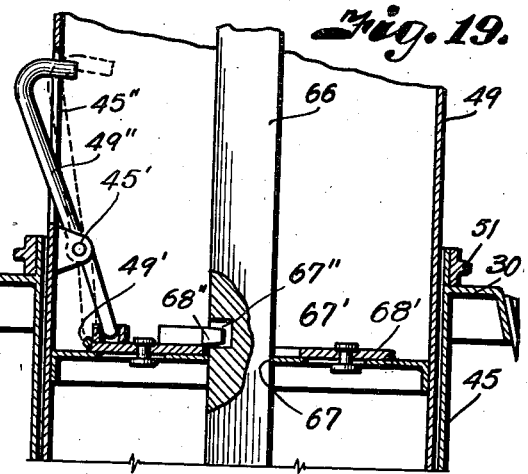
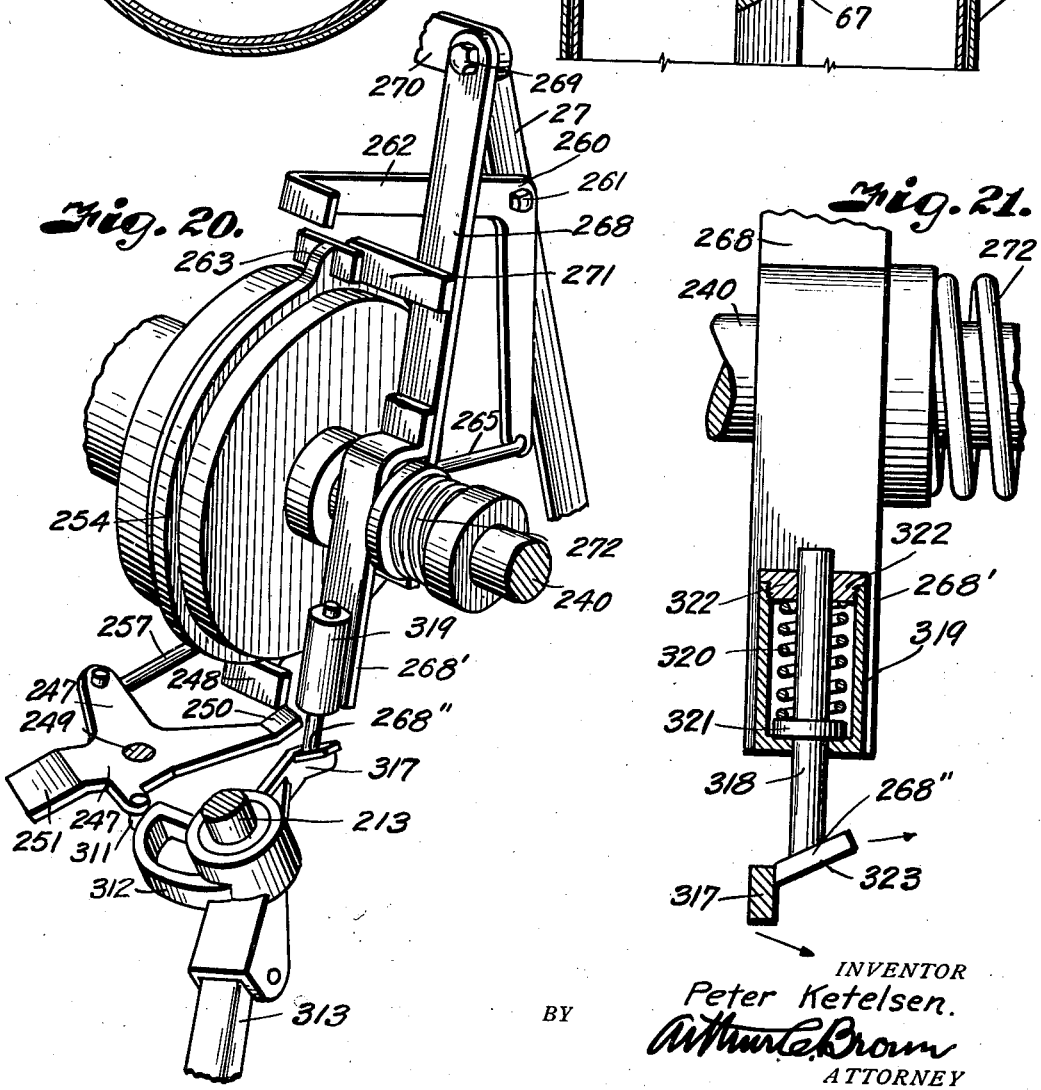
INVENTOR
Peter Ketelsen.
BY
ATTORNEY Patented Jan. 13, 1942

2,269,770

UNITED STATES PATENT OFFICE 2,269,770

GRAIN SHOCKER

Peter Ketelsen, Wichita, Kans.

Application October 21, 1939, Serial No. 300,574

20 Claims. (Cl. 56—413)

This invention relates to grain shockers particularly adapted for use in connection with ordinary grain binders to receive the sheaves or bundles as they are delivered from the binder, and to arrange the sheaves in shock form to be deposited upon the ground while the binder and shocker are drawn over a field.

The principal object of the invention is to provide a device of this character which is positive in operation and capable of setting upright shocks which are stable and well adapted in shedding the elements.

Other objects of the invention are to provide a shocker adapted for automatic operation; to provide a shocker that is of relatively simple construction compared to the work accomplished; to provide a shocker with a form on which the bundles are successively packed when delivered thereto by an automatically operated carrier operating in synchronism with the binder mechanism; and to provide means for automatically stripping the shock from the form and depositing the shock on the ground.

In accomplishing these and other objects of the invention, as hereinafter pointed out, I have provided improved details of structure, the preferred forms of which are illustrated in the accompanying drawings, wherein:

Fig. 3 is a similar perspective view of the shocker as it appears from the opposite side.

Fig. 4 is a fragmentary detail section through one of the gate stile expansion mechanisms.

Fig. 5 is a rear perspective view of the shocker showing the shock former in the position it assumes upon releasing of a formed shock.

Fig. 9 is a similar section showing the bundle carrier in position for discharging a bundle into the shock former.

Fig. 10 is a similar section but showing the gate in open position to release a formed shock.

Fig. 11 is an enlarged detail elevational view, partly in section, of the actuating gearing.

Fig. 12 is an underneath view thereof.

Fig. 15 is a detail perspective view of the shock former rotating head.

Fig. 16 is a vertical section through the shock former showing the bundle supporting forks in projected position for receiving the bundles from the bundle carrier.

Fig. 17 is a similar section showing the forks in retracted position and the former raised to deposit a formed shock on the ground.

Fig. 18 is a horizontal section through the shock former, particularly illustrating the latch connecting the tubular body with the reciprocator shaft and showing the latch in engaged position.

Fig. 19 is a vertical section showing the latch in engaged position.

Fig. 20 is a detail perspective view of the clutch control levers.

Fig. 21 is an enlarged section of the lower portion of the trip lever which prevents actuation of the shock former while a bundle is being empaled thereon.

Figure 1:
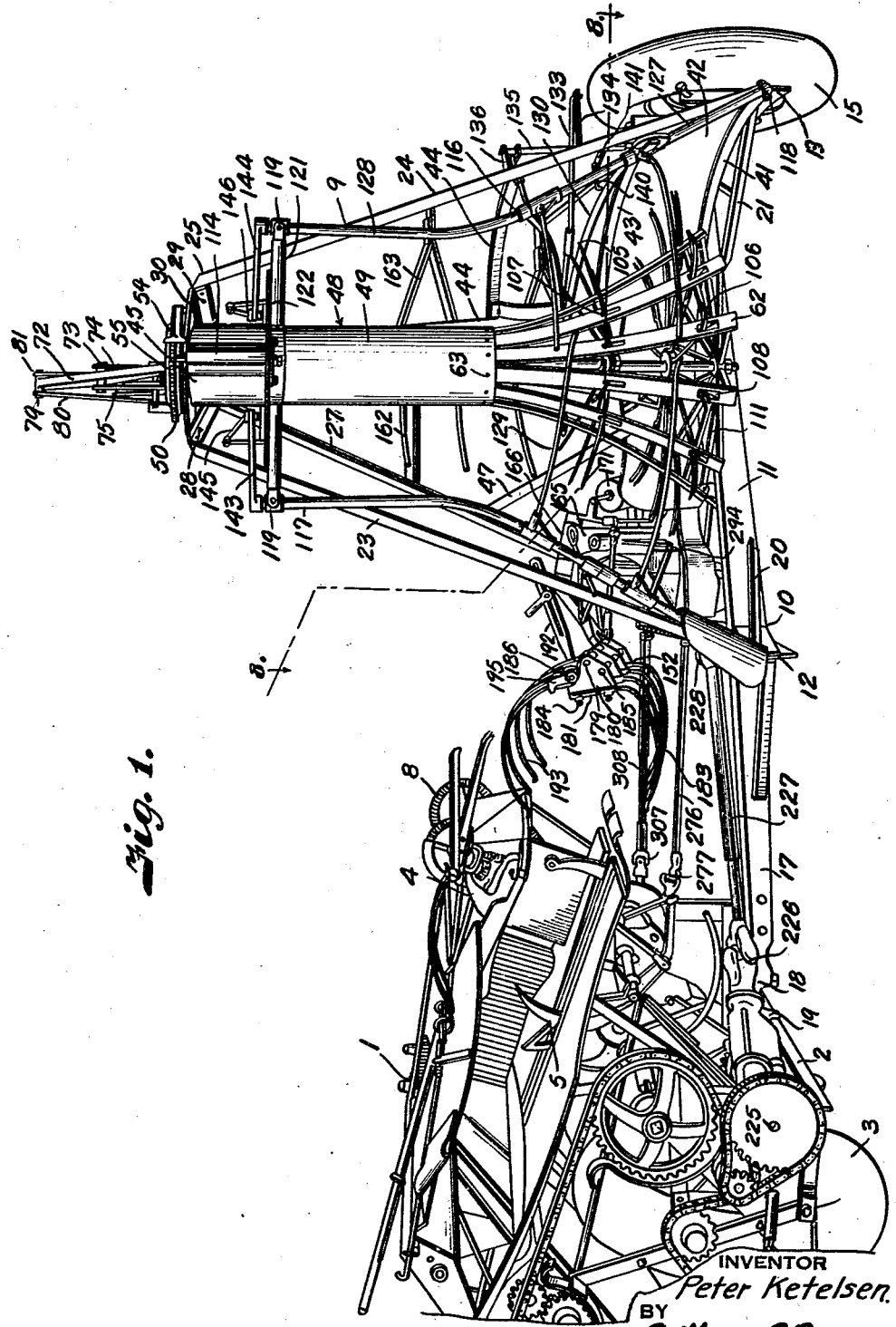
Fig. 1 is a rear perspective view of the delivery portion of a binder equipped with a shocker constructed in accordance with the present invention.

Referring more in detail to the drawings:

1 designates a standard grain binder having a frame 2 supported on a main ground wheel 3, and adapted for carrying a bundle tying and delivery mechanism generally indicated 4. The bundles when formed and tied are delivered therefrom upon release of a trip hook 5 and actuated through a pitman 6 that is connected by a wrist pin 7 with an actuating gear 8. In the binder illustrated, the various mechanisms are driven from the main traction wheel through a counter-shaft as in conventional practice, or from the power take-off 8' from the tractor which pulls the binder. The binder specifically forms no part of the present invention, but is illustrated to give better understanding of the shocker, and the parts of the binder mentioned relate to operation of the shocker embodying the present invention.

The shocker is generally indicated 9, and includes a frame 10 having a main transverse sill 11 to which are secured spaced longitudinal sills 12 and 13 connected at their forward ends by a transverse member 14. The outer side of the frame, which includes the longitudinal sill 13, carries an adjustable spindle mounting a supporting wheel 15. The main transverse sill is connected by an angularly diverging draft arm 16 with the draft tongue of the binder. The inner end of the main sill has an extension 17 and terminates in a hook 18 engaged in a bracket 19 on the side rail of the binder frame 2, at a point below the bundle delivery mechanism 4.

Figure 2:
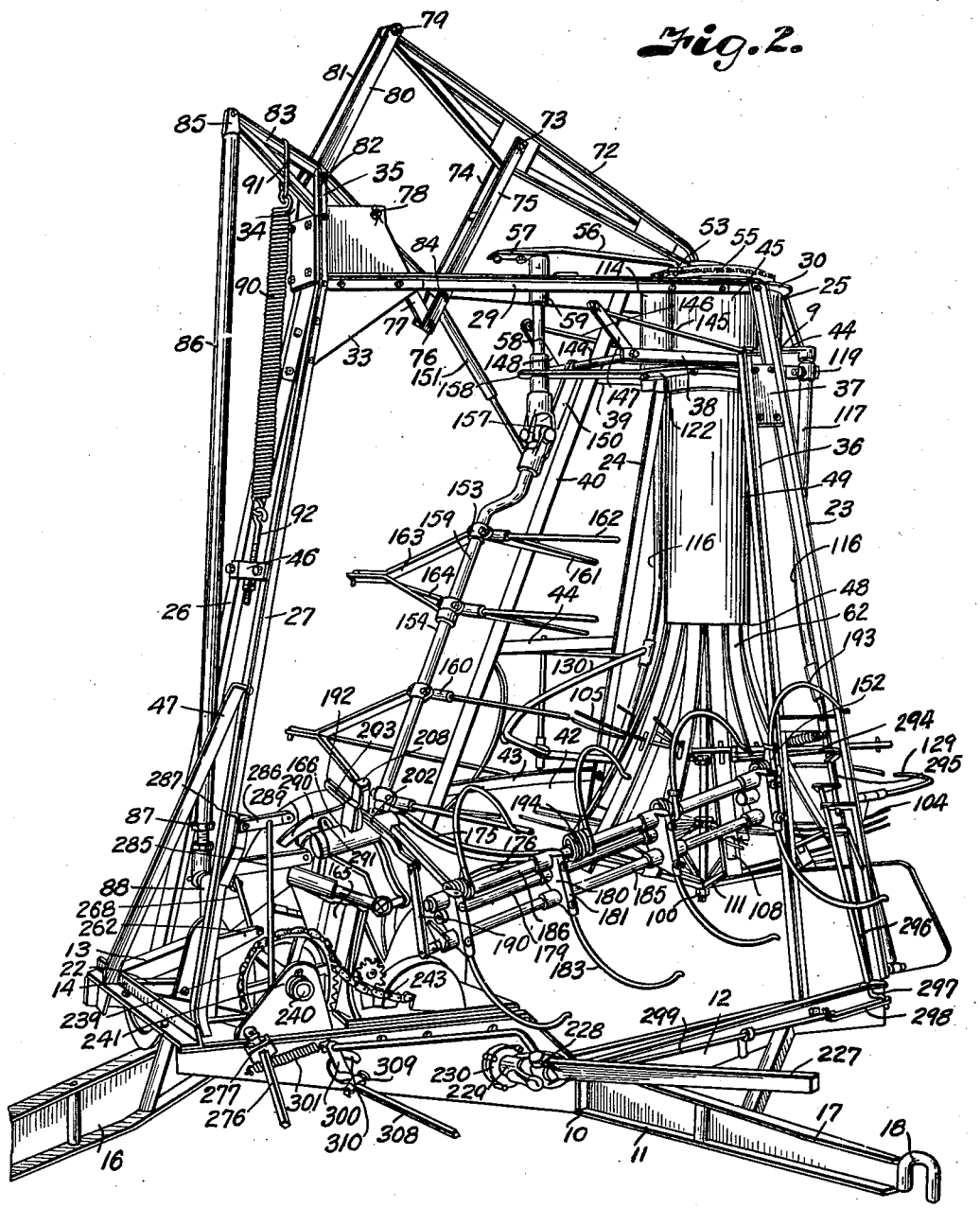
Fig. 2 is a perspective view of the shocker as viewed from the side adjacent the binder.

The sills 12 and 13 extend rearwardly from the main sill and are braced therefrom by diagonals 20 and 21 to form the main supporting structure for the shock forming mechanism, later described. The forward end of the sill 12 cooperates with a longitudinal member 22, which connects the main sill with the transverse member 14, to mount the shocker actuating and timing mechanism. The rear ends of the sills 12 and 13 mount rear legs 23 and 24 of a tower-like frame 25, which also includes forward legs 26 and 27 connected with the forward ends of the longitudinal sills. The front and rear legs are connected by spaced horizontal members 28 and 29 carrying a substantially circular platform 30, having a central opening 31 for a purpose later described. The forward ends of the horizontal members 28 and 29 are braced from the front legs by suitable gusset plates 32 and 33. The gusset plates extend above the horizontal members and connect with spaced upper extensions 34 and 35 of the legs, as best shown in Fig. 2. Cooperating with the leg 23 is a shorter leg 36 spaced forwardly therefrom and connected at its lower end to the longitudinal member 12, and at its upper end by a gusset plate 37 (Fig. 2) with the leg 23.

The legs 36 and 23 carry a longitudinal member 38 that is supported below the upper member 29. Attached to the rear leg 24, at the opposite side of the machine, is a similar horizontal member 39 having its forward end supported by a brace leg 40. The lower end of the brace leg 40 is carried on an arcuate rail 41, having one end attached to the main transverse sill and its rear end supported on the rear end of the outer longitudinal sill 13, as best shown in Figs. 3, 4, 9 and 10. The leg 40 is of sufficient length to connect with the other of the upper horizontal members 28, as clearly shown in Fig. 2.

The legs 23 and 40 cooperate with the arcuate-shaped member 41 to carry an arcuate-shaped, inwardly flaring plate 42, which forms a guard contacting the lower ends of the bundles that are deposited on the shocker form, later described. These legs are further connected by an arcuate rail 43 located at the upper edge of the guard, and an upwardly spaced, arcuate rail 44. The leg members 23, 24, 36 and 40 thus converge upwardly to intersect with an extended axis of the opening 31 in the platform 30.

Carried by the lower and shorter longitudinal members 38 and 39 is a collar 45, having its upper end supported by the platform 30. The forward legs 26 and 27 are connected by a cross tie 46, and the leg 27 is connected with the front transverse member 14 by a brace 47. Slidable in the collar 45 is a shock forming mechanism 48, including a cylindrical body 49, best illustrated in Figs. 15, 16 and 17. The upper end of the tubular body carries a laterally extending annular flange 50, which normally rests upon an oscillatory ring 51 journalled to oscillate about the tubular body and having diametrically arranged arms 52 and 53.

The arms 52 carries a pivoted pawl 54, engaging with ratchet teeth 55 formed in the periphery of the flange 50. The other arm 53 is connected by a link 56 with an arm 57, carried on the upper end of a shaft 58 which is journalled in a bearing 59 carried upon a bar 60, the shaft 58 being operated in a manner later described. The tubular body depends through the collar 45 and has its lower end closed by an inset head 61, between which a circular series of depending flexible arms 62 are suspended from rivets 63, passing through a flange 64 on the head and through the lower portion of the tubular body, as clearly shown in Figs. 16 and 17.

Reciprocably mounted in a polygonal-shaped opening 65 is a reciprocatory shaft 66 of similar cross-section. The upper end of the shaft projects through an opening 67 in an inset head or partition 68 near the upper end of the tubular body. The projecting upper end of the shaft terminates in a reduced threaded shank 69 on which a yoke 70 is swivelly mounted. The yoke 70 is pivotally connected by a pin 71 carried at one end of a rocker arm 72. The rocker arm 72 is pivotally mounted on a cross-pin 73 carried at the outer ends of spaced links 74 and 75. The lower ends of the links are connected by a similar cross-pin 76 with links 77 pivoted to the upper portion of the gusset plates 33 on a cross-pin 78. The rear arm of the rocker arm 72 is connected by a cross-pin 79 with links 80 and 81, having their lower ends pivotally connected with a cross-pin 82 carried by the projecting upper ends 34 and 35 of the forward legs 26 and 27. Pivoted on the cross-pin 82, between the links, is a similar rocking lever 83, having its forward end projecting between the links 74 and 75 and connected therewith by a cross-pin 84 at a point spaced below the cross-pin 73 at a distance equal to the pivotal spacing between the pivots of the links 80 and 81. Pivoted to the opposite end of the rocking lever, by a yoke 85, is a pitman 86 adjustably connected, as at 87, with a crank-arm 88, later described.

The tubular body 49 and mechanism carried thereby, as well as the rocking levers, are pivotally balanced by means of a spring 90, having one end fixed to a stirrup 91 carried by the rocking lever 83 and its opposite end fixed to the cross tie 46 by an eye-bolt 92, as shown in Fig. 2.

Projecting from the lower end of the shaft 66 is a reduced extension 93 forming a shoulder 94 with the polygonal portion of the shaft. Abutting against the shoulder 94 is a collar 95, spaced from a similar collar 96 by a sleeve 97. The collar 96 is retainingly engaged with the lower end of the sleeve 97 by a sleeve 98, spacing a third collar 99 which is retained on the reduced extension by a nut 100, as clearly shown in Figs. 16 and 17. The collars 95 and 96 have a plurality of radially extending ears 101 and 102 respectively, to which are pivoted arms 103 and 104, having single and double tines or prongs 105 and 106 respectively, and which project through pocket-like openings 107 and 108 of the flexible arms 62, and extensions 109 attached to the lower ends thereof. The extensions 109 have inwardly directed ears 110 that are connected by links 111 with ears 112 on the collar 99. The shaft 66 has reciprocal movement within the cylindrical body of the shock former, limited by a bumper 113 on the downstroke, and limited on the upstroke by the collar 95, so that the tines 105 and 106 are projected through and retracted from the pocket-like openings incidental to spreading of the flexible arms 62 by the links 111 as clearly shown in Figs. 16 and 17.

With this arrangement the reciprocatory shaft 66 has independent movement relatively to the tubular body 49 at the beginning of the upstroke or until the collar 95 engages the head 61. The shaft and tubular body are then raised together during the remainder of the upstroke. On the downstroke it is desirable that the tubular body and shaft move together until the flange 50 seats on the upper end of the collar 45 and unless there is a direct connection between the shaft and tubular body, the tubular body will tend to lag. In order to overcome this difficulty, I have provided a latch, best illustrated in Figs. 18 and 19, whereby the tubular body is connected with the shaft during the initial upward movement of the tubular body. Therefore on the downstroke the tubular body will move at the same speed as the shaft, but just before the flange 50 reaches the upper end of the collar 45 the latch will be disengaged. The latch includes a plate 68' slidably fixed on the partition 68 and having an elongated opening 67' therein for passing the shaft. Carried by the plate 68' is a tongue 68'' adapted to engage in a notch 67'' in the side of the shaft, as clearly shown in Figs. 18 and 19. The plate 68' is urged toward latching position by a spring 49' but is retained out of latching engagement by means of a lever 49''. The lever 49'' is pivotally mounted, as at 45', to the inner wall of the tubular body and has its upper end acting through a slot 45'' so that when the tube begins to move through the collar 45 on the upstroke, that end of the lever will pass through the slot and allow the spring 49' to move the plate 68' into latching engagement with the shaft. Therefore directly at the beginning of the downstroke of the shaft, the tubular body will move therewith until the projecting portion of the lever is cammed inwardly by engagement with the upper end of the collar 45 so that the opposite end of the lever effects retraction of the tongue 68'' from engagement with the notch 67''. The tubular body then comes to rest with the flange 50 thereof seated on the upper end of the collar 45 and the shaft continues its downward movement expanding the arms on which the sheaves are empaled, as later described.

Mounted on the opposite diametrical sides of the collar 45 are shock absorbers 114 of any suitable character for checking downstroke of the shock former.

The mechanism just described forms the core of the shock, and the outer portion is formed by the arcuate guard plate 42 cooperating with the rail 44 and gates 115 and 116 normally closing the space between the rear legs 23 and 24. The gates 115 and 116 are of substantially the same construction and include rock-shafts 117, having their lower ends pivoted in bearings 118 and their upper ends rotatably mounted in universal bearings 119, carried by plungers 120 (Fig. 4) slidable in tubular arms 121 supported by a lower plate 122 carrying the collar 45 (Fig. 1), the plunger being retractible by coil springs 123 engaging against a head 124 of the plunger, and against collars 125 anchored in the arms 121 by set-screws 126.

The lower portions 127 of the rock-shafts 117 converge upwardly in accordance with the conical contour to be imparted to the shock, but the upper portions 128 extend substantially perpendicular when the gates are in closed position as shown in Fig. 1. Carried by the portions 127 of the rock-shafts 117 are arcuate arms 129 which cooperate with the rail 43 and guard plate 41 to form a substantially circular band about the shock, with the exception of the space between the legs 36 and 40.

When the gates are opened, and the shock carrier raised to deposit a shock, the shock is pressed by a substantially arcuate-shaped arm 130 carried by the rock-shaft 117 of the gate 116, to move in front of the shock when the gates are opened, as later described. The arm 130 is pivoted on the rock-shaft and is actuated upon closing of the gates by a link 133 fixed to the arm 134 of the rock-shaft 135, having its lower end pivoted in the rail 43 and its upper end in a bracket 136 projecting from the rail 44, the shaft being oscillated incidental to opening and closing of the gate by means of a link 137 connecting an arm 138 on the shaft 135 with an arm 139 on the rock-shaft 117 of the gate 116. In order that the arm 130 may be yieldably retained in position, it is connected by a link 140 with an arm of a bell-crank 141, which is pivoted on the shaft 135 and has its other arm connected by a spring 142 with the leg 24 (Fig. 9).

The upper ends of the rock-shafts 117 carry crank-arms 143 and 144 that are connected by links 145 and 146 with arms 147 and 148 on a rock-shaft 149 having its ends pivotally mounted in the forward ends of the short longitudinal members 38 and 39. Depending from the shaft 149 is an arm 150 (Fig. 3). The arm 150 is connected by a link 151 with the cross-pin 76, previously mentioned, so that when the rocking levers are actuated to raise and lower the tubular body of the shock former, the gates are simultaneously actuated to permit deposit of a shock under the pressing influence of the arm 130.

The sheaves are received by a sheaf carrier generally designated 152 and including hinged cradle parts which are normally supported in open position parallel with the bundle or sheaf discharge of the binder. The sheaf carrier is adapted to swing and simultaneously rotate to a vertical position so that sheaves carried thereby may be removed from the carrier and deposited on the tines by a packer generally designated 153. The packer 153 comprises a crank-shaft 154 inclined upwardly toward the vertical axis of the shock former and has its lower end rotatably mounted in a bearing 155 of a gearing housing 156, later described. The upper end of the crank-shaft connects through a universal joint 157 with the shaft 58 previously described, the universal joint connection being rotatably supported by an arm 158 projecting from the plate 122 (Fig. 2). The intermediate portion of the crank-shaft is offset to provide a crank 159 adapted to gyrate in a circular path when the crank-shaft is rotated as later described. Loosely mounted on the crank-shaft is a series of spaced packer arms 160, having forked terminals 161 and 162 adapted to straddle the uprighted bundle and to push the bundle from the carrier onto the tines of the shock former. The packer arms have tail portions 163 connected by links 164 with a fixed part of the frame, so that when the crank is rotated the forked arms of the packer oscillate to and from engaging position with an uprighted bundle.

Figure 7:
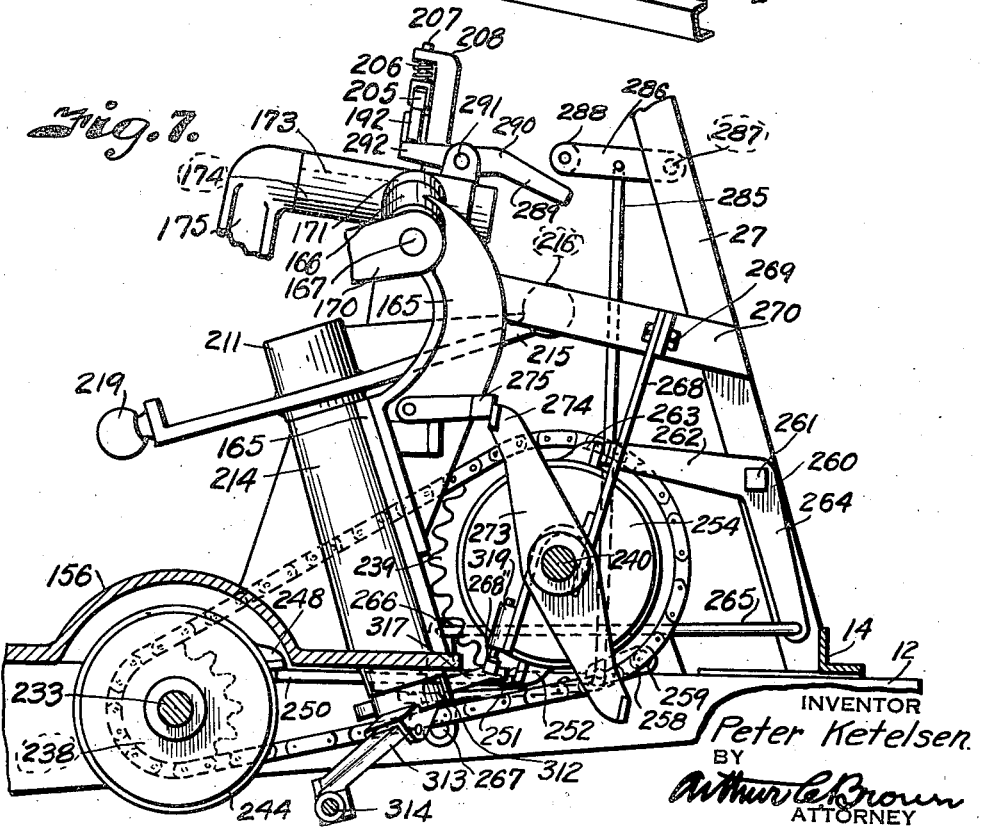
Fig. 7 is a detail elevation of the clutch tripping levers.
Figure 8:
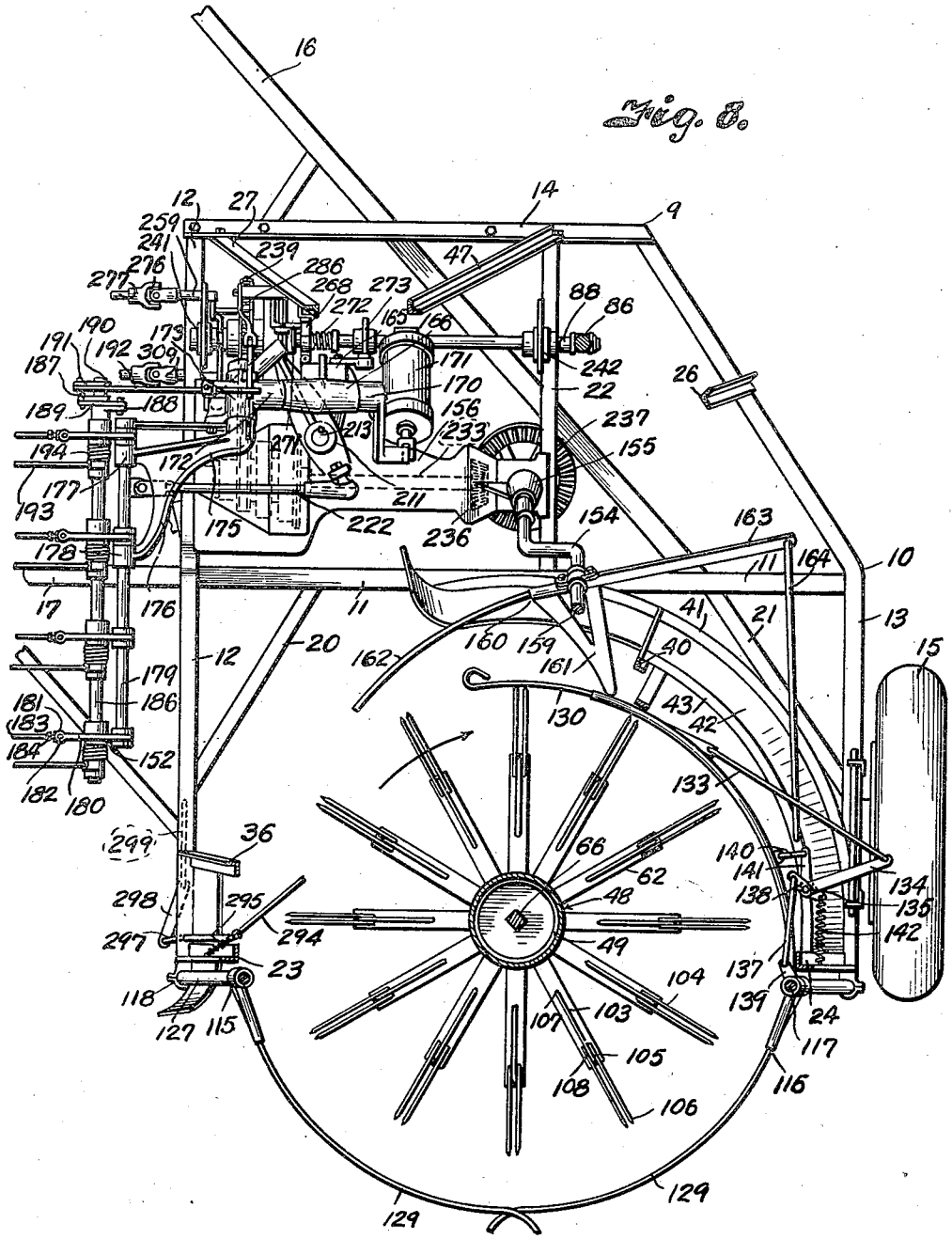
Fig. 8 is a horizontal section through the shocker on the line 8—8 of Fig. 1, a portion of the section being staggered so that it passes between the arms of the gates, the bundle carrier being in receiving position relative to the binder, and the shock former in position for receiving the bundles.

The sheaf carrier 152 is movably mounted on a support 165 forming a part of the gear housing 156 (Figs. 7, 8, 10 and 11). The support 165 has a head 166, having an axial bore 167 extending transversely of the direction of travel of the machine and slightly inclined upwardly toward the binder side of the machine, as clearly shown in Fig. 11. Rotatably mounted in the bore 167 is a shaft 168 carrying, at one end, a bracket 169, and at its other end a lever arm 170 adapted to actuate the piston (not shown) of a check or dash-pot 171. The bracket 169 includes a sleeve portion 172 fixed rigidly to the shaft 167 and which has a T-shaped head 173, having a bore in which is oscillatably mounted a shaft 174 which extends in a substantially fore and aft direction when the carrier is in receiving relation with the binder, and which is adapted to swing to a substantially vertical position when the carrier is moved to deposit a sheaf on the shock former. Fixed to the end of the shaft is the arm 175 of a yoke 176. The branches 177 and 178 oscillatably journal a shaft 179 on which the sheaf carrier is mounted, as best shown in Figs. 8 and 11.

Carried by the shaft 179, at spaced points along the length thereof, are plate-like brackets 180, terminating at their edges opposite the shaft in socket portions 181 to mount the shanks 182 of fingers 183, the shanks being adjustably supported in the sockets by set-screws 184 (Fig. 11). The fingers 183 cooperate with each other when the carrier is in receiving relation with the binder to form a substantially trough-like basket into which a sheaf is deposited. Oscillatably journalled in the plate-like brackets 180 are spaced, parallel shafts 185 and 186, having laterally extending arms 187 and 188 pivotally interconnected by a link 189. The shaft 185 also carries a longer arm 190, having pivotal connection 191 with a latch-like control lever 192, later described. The shaft 186 mounts a plurality of fingers 193, curved oppositely to the fingers 183 and adapted to cooperate therewith in gripping a sheaf when it is to be carried from receiving position to a position where it is deposited upon the shock former. The fingers 193 are formed of spring-like material and their anchoring ends terminate in coils 194 sleeved over the shaft 186 and have their ends anchored to the plate-like brackets 180. The shaft 186 has an arm 195 for each finger 193, and these arms are fixed to the shaft so that they rotate therewith. The ends of the arms 195 have sleeve-like terminals 196 through which the fingers 193 are respectively extended. The fingers 193 are therefore connected with the arms 195, and are adapted to rotate with the shaft when the respective fingers are moved to open position for receiving a sheaf, as shown in Fig. 11. This movement of the fingers winds the coils 194 about the shaft 186 so that the stored up tension returns the fingers into gripping relation with the shaft when the control arm 190 is tripped through the latch arm 192, as now to be described.

Also forming an integral part of the bracket 169 are oppositely directed arms 197 and 198, carrying laterally extending studs 199 and 200 respectively. The control lever 192 has a slot 201 provided with offset portions 202 and 203 forming a latch shoulder 204 therebetween adapted to engage the stud 200 which holds the fingers of the carrier in open position against action of the spring-like coils 194, as shown in Fig. 11. The control lever 192 is normally urged into position so that the latch shoulder thereof is moved into engagement with the stud 200. This is effected by a roller 205 engaging the edge of the control lever and having pressure exerted thereagainst by a spring 206 sleeved over a shank 207 that is slidably mounted in an extension 208 of the arm 198.

Pivoted on the shaft 179 is a control link 209 having a slot 210 in which the stud 199 is engaged. When the latch shoulder is engaged with the stud 200, the link 209 is in a position so that the stud 199 engages the rear end of the slot 210 (Fig. 11). As previously stated, the carrier is adapted to simultaneously swing from a horizontal position parallel with the sheaf discharge of the binder through an arc to a substantially vertical position where the sheaf is removed and deposited on the tines of the shock former by the packer 153. This movement is effected by means of a rocker arm 211, keyed, as at 212, with the upper end of a shaft 213 which is rotatably mounted in a sleeve-like bracket 214 carried by the gear housing 156 adjacent the bracket 165. One terminal 215 of the rocker arm 211 terminates in a ball 216, engaged in a ball socket 217 of a rod 218 having a ball and socket connection 219 with the lower arm 197, previously described. The other terminal 220 is connected by a ball and socket joint 221 with a link 222, which in turn is connected with an ear 223 on the shaft 179 by a clevis 224. It is thus obvious that when the shaft is turned to move the rocker arm in the direction of the arrow, as at A (Fig. 11), the rod 218 exerts a pushing force against the arm 197 that causes the bracket 169 to rotate with its carrying shaft 168 in the direction of the arrow as at B (Fig. 11). Simultaneously the link 222 exerts a pulling force in the direction of the arrow C, so that the arm 175 swings in the direction of the arrow D. Consequently, the bundle carrier will move from receiving position, as shown in Fig. 8, to a discharge position, as shown in Figs. 9 and 10.

All of the mechanisms previously described are powered from the binder and auxiliary engine operating binder mechanism, or from a power take-off of a tractor pulling the binder, as previously mentioned. In the illustrated instance the power is taken from a power shaft of the binder and under control of the sheaf delivery mechanism, now to be described.

Connected with a driven shaft 225 of the binder, by means of a universal joint 226, is a telescoping shaft 227, which in turn is connected by a universal joint 228 with a shaft 229, Figs. 9 and 11. The shaft 229 is rotatably supported in a sleeve-like bearing 230 carried by the gear housing adjacent the sill 12. The shaft projects into the gear housing and carries a helical gear 231, meshing with a helical gear 232 rotatably mounted on a counter-shaft 233, which is rotatably mounted at the ends thereof in suitable bearings 234 and 235. The counter-shaft 233 extends transversely of the machine, and has a bevelled gear 236 meshing with a bevelled gear 237 on the shaft 154, which shaft operates the packer previously described. Fixed in driving relation with the gear 232 is a sprocket 238 for driving a sprocket 239 rotatably mounted on a crank-shaft 240. The crank-shaft 240 is rotatably journalled in bearings 241 and 242 and carries the crank 88, previously described. The sprockets 238 and 239 are interconnected by a driving chain 243, as best shown in Fig. 11. The gear 232 is connected in driving relation with the shaft 233 by means of a trip clutch 244, having a rotary member 245 connected with the gear, and a rotary member 246 fixed to the shaft 233, and which is adapted to be drivingly interconnected with the member 245 upon release of a trip lever 247, which is engageable by a stop lug 248 on the driven element 246.

The trip lever 247 is in the form of a bell-crank, best shown in Fig. 12, and is pivotally mounted on a stud 249 carried by part of the gear case 156. The bell-crank has one terminal 250 adapted to stoppingly engage the stop lug 248, and an oppositely arranged terminal 251 adapted to engage a diametrically arranged stop lug 252 on the driven element 253 of a trip clutch 254, which is mounted on the shaft 240. The driving element 255 of the clutch is connected in driving relation with the sprocket 239. The bell-crank also includes an arm 256, connected by a link 257 with an arm 258 on a shaft 259. The driven element 253 of the clutch is also controlled by a bell-crank lever 260 that is pivotally mounted, as at 261, on the leg 27, and has an arm 262 engaged with a lug 263 on the driven member 253, and an arm 264 connected by a link 265 with an arm 266 on an actuating shaft 267. The driven element of the trip clutch 254 is also controlled by a lever 268 pivoted, as at 269, on a brace 270 that is connected with the leg 27. The lever 268 has a lateral lug 271 engageable with the lug 263, the lever being yieldingly retained in the path of the lug 263 by a spring 272 that is sleeved on the shaft 240 and pressed against a yoke-shaped end on the lever. The lever 268 has a depending arm 268' provided with a spring-pressed head 268'' for a purpose later described. A lever 273 is fixed to the shaft 240 and has ends 274 adapted to engage a pivoted pawl 275 for preventing retractive rotation of the shaft (Fig. 7).

Figure 6:
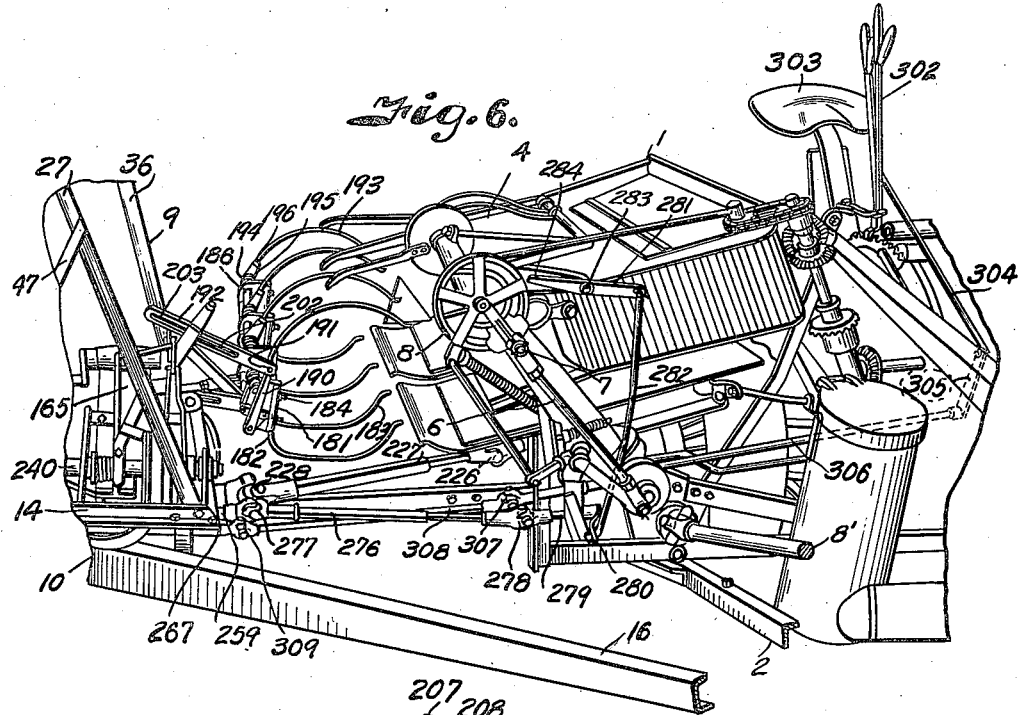
Fig. 6 is a front perspective view of the binder showing the trip mechanism for effecting operation of the shocker.

The shaft 259 is connected with a telescoping shaft 276 by a universal joint 277. The other end of the telescoping shaft is connected by a universal joint 278 with a shaft 279, mounted on the frame of the binder and having an arm 280 that is connected by a trip lever 281 through a link 282. The trip lever 281 is pivotally mounted, as at 283 (Fig. 6), and has the free end 284 adapted to be engaged by the projecting end of the wrist pin 7, previously mentioned. It is thus obvious that when the gear 8 is making a revolution to release a sheaf from the binder into the carrier, the wrist pin engages the end 284 of the lever 281 to actuate the shaft 259 and effect movement of the bell-crank lever 247, so that the terminals 250 and 251 are moved out of stop engagement with the lugs of the respective clutches. Also connected with the arm 258 is a rod 285 connected with a lever 286 pivotally mounted, as at 287, on the leg 27 Fig. 7). The free end of the lever 286 carries a roller 288 adapted to engage the tail portion 289 of a lever 290 that is pivotally mounted, as at 291, in such a position that the free end 292 thereof engages under the control lever 192, thereby raising the control lever on its pivotal connection 191 to effect release of the shoulder 204 from engagement with the stud 200, whereupon the stored up tension in the coils 194 snaps the fingers 193 into gripping engagement with a sheaf deposited on the fingers 183, as later described.

When the bell-crank lever 247 is shifted out of position to disengage the lug of the trip clutch 244, the other trip clutch will not be effective since the bell-crank lever 260 maintains stopped engagement with the lug 263, as shown in Fig. 7. Therefore, only the parts actuated by the shaft 233 will be operated, that is, the sheaf carrier will be moved from a receiving relation with the binder to its position adjacent the shock former, the packer moved to disengage the sheaf, the carrier returned to receiving relation with the binder, and the shock forming tube rotated one step in its supporting collar.

The tube of the shock former does not reciprocate to release a shock until the shock is completely formed and the first deposited sheaf reaches a position to actuate a finger 294 that is yieldably mounted on a rod 295 extending alongside the leg 23 and having connection with a rod 296 which has a crank 297 on its lower end.

The crank 297 is connected by a link 298 with a rod 299, reciprocably mounted alongside of the sill 12 and which connects with a lever arm 300 on the shaft 267 (Fig. 2). The arm 300 and rod connected therewith are normally retained in retracted position by a spring 301 fixed to the arm and having its opposite end anchored to the sill 12, as shown in Fig. 2. Therefore when the shock engages the finger, the shaft 267 is actuated to move the bell-crank lever 260 so that the arm 262 thereof is disengaged from the lug 263, whereupon the trip clutch 254 is rendered effective in rotating the crank-shaft 240, whereby the crank 88 is actuated to operate the rock levers 83 and 72 to raise the tube 49 in its supporting collar and effect collapse of the arms 62 with retraction of the tines, so that the formed shock is slipped therefrom and deposited on the field.

Operation of the shaft 240 also effects opening of the gates through the shaft 58, previously described. The shaft 240 is also rendered effective in releasing sheaves deposited from the shock former under control of the operator. This is effected by a hand lever 302 mounted adjacent the operator's seat 303 on the binder (Fig. 6), and which is connected by a link 304 with an arm 305 attached to the end of the rock-shaft 306 journalled on the binder. The shaft 306 is connected by a flexible joint 307 with a telescoping shaft 308, which in turn is connected by a flexible joint 309 with a hook-shaped lever 310 engaged by the arm 300. Therefore when the lever 302 is rocked and the shafts connected therewith rotated, the hook 310 is effective in swinging the arm 300 to accomplish the same result as effected by the yieldable finger 294 which is contacted by a sheaf on the shock former.

Owing to the fact that the trip clutch has two stop lugs, it is necessary to provide means for retaining the bell-crank lever 247 out of position while the lug 263 passes the terminal end 251 thereof. This is effected by providing the bell-crank with a lug 311 that is adapted to be engaged by a cam 312 on a crank-arm 313 on the lower end of the shaft 213, which arm is connected by a link 314 connected with a wrist pin 315 mounted on the lower face of the gear 237. Therefore when the gear moves to rotate the shaft 154, the shaft 213 is also operated, and the arm thereof engages the lug to hold the terminal 251 thereof out of the path of travel of the lug 263, as shown in Fig. 12. However, upon return movement of the arm 313 responsive to continued rotation of the gear 237, the arm moves away from the lug to permit a spring 316 to move the bell-crank into position for stoppingly engaging the lug 252.

It is possible when the shock is nearly formed, for the first shock to have reached the finger 294 before the bundle carrier has finished deposit of a sheaf on the form carrier. In order to prevent actuation of the shock former until the last sheaf has been deposited, the lug 271 on the lever 268 retains its engagement with the stop 263 after the stop has been released by the arm 262 of the bell-crank 260. Therefore the shock former cannot function to deposit a shock until the bundle carried has completed its movement to deposit the sheaf contained therein. However, when the bundle carrier has functioned and begins its return stroke, an arm 317 engages the head 268" on the arm 268, previously mentioned, so that the lever 268 is shifted against action of the spring 272 to retract the lug 271 thereon from contact with the lug 263. This releases the clutch 254 so that the shock former is actuated to deposit the completed shock. The head 268" is carried by a stem 318 slidable in a spring housing 319 fixed to the terminal end 268' of the arm 268. Contained within the housing and sleeved over the stem 318 is a coil spring 320, having one end bearing against a collar 321 on the stem and its opposite end against a plug 322 closing the top of the spring housing. Thus when the arm 317 is moved in an anti-clockwise direction (Fig. 20) the arm engages an inclined portion 323 of the head 268" to raise the head against action of the spring 320. However, upon passing the arm 317, the spring returns the head to normal position so that return movement of the arm engages the head to swing the lever out of clutch stopping position.

Figure 13:
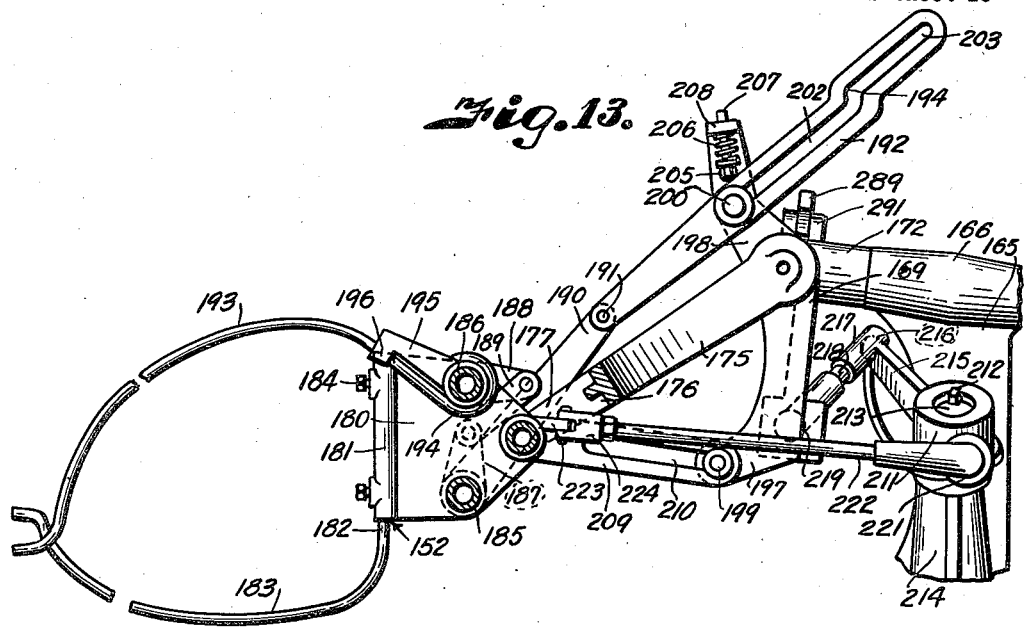
Fig. 13 is a section through the bundle carrier particularly illustrating the control levers therefor.
Figure 14:
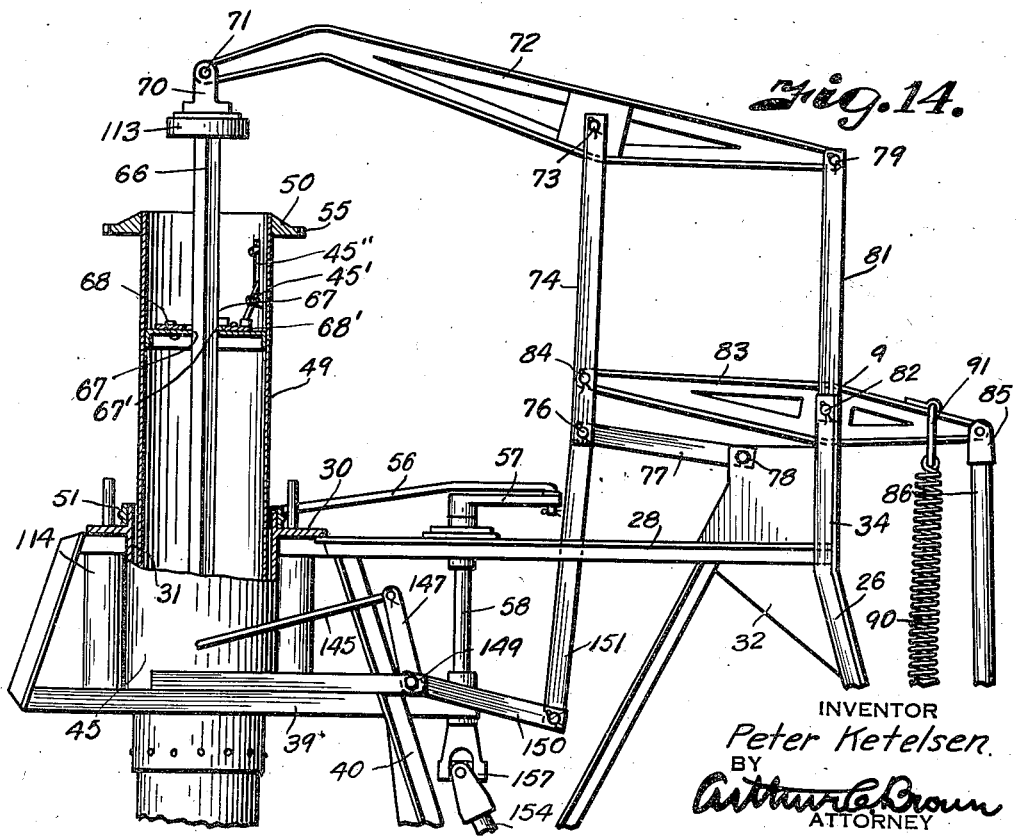
Fig. 14 is a side elevational view of the upper portion of the shock forming apparatus.

In using the shocker, the draft arm 16 is connected with the draft tongue of the binder, and the extension 17 of the main sill 11 is connected with the bracket 19 which is attached to the binder. The telescoping shafts 276, 308 and 227 are then connected and the machine is ready for operation. As the binder is drawn along the field, the cut grain is delivered to the tying mechanism, formed in sheaves or bundles which are tied and then discharged incidental to actuation of the mechanism 5, in response to rotation of the gear 8. As the gear rotates, the wrist pin 7 engages the free end 284 of the lever 281, whereby the lever is momentarily rocked on its pivot 283 to rock the shaft 279 through the link 282 and arm 280 and partially rotating the telescoping shaft 276 and the connected shaft 259 which rocks the arm 258 to swing the lever 286 through the link connection 285. Since the sheaf carrier is normally at rest in open position to receive the discharged sheaf, it is deposited upon the fingers 183 and is now ready to be gripped by the fingers 193. Movement of the lever 286 causes the roller 288 to engage the tail portion of the lever 290 so that the free end thereof raises the control lever 192 against action of the spring 206, thereby disengaging the stop shoulder 204 with respect to the stud 200. The stored-up action in the springs 194 is then released so that the fingers 193 move to clamping position with respect to the fingers 183 and grip the sheaf. During this movement the control lever 192 shifts so that the stud 200 is positioned in the portion 202 of the slot. Simultaneously the arm 190 has swung to the right, shifting the arms 187 and 188 through their link connection 189 to the positions shown in Fig. 13. Substantially simultaneous with these operations, the arm 258 rocks the bell-crank lever 247 through the link 257, moving the terminals 250 and 251 thereof out of engagement with the lugs 248 and 252 on the driven members of the trip clutches 244 and 254. However, the bell-crank lever 260 is not operated, and the trip clutch 254 remain stationary. Since the shaft 227 is rotating the shaft 229 and gears 231 and 232, the driven element 245 of the trip clutch 244 is being constantly rotated and upon release of the driven element 246, the clutch connection is effected with the shaft 233. Consequently the gear 236 will rotate the gear 237 and operate the link 314 to swing the arm 313 and effect oscillation of the shaft 213. This movement of the shaft 213 in the direction of the arrow "A" (Fig. 11) causes the arm 215 to exert a pushing force on the rod 218 so that the bracket 169 is rotated in the direction of the arrow "B" with the supporting shaft 168 thereof rotating in the bore 167. This movement of the bracket 169 effects movement of the sheaf carrier 152 from a horizontal toward a perpendicular position. Simultaneously with these movements the other terminal 220 of the rocker arm 211 exerts a pulling influence on the link 222 so that the arm 175 swings in the direction indicated by the arrow "D" (Fig. 11), thereby moving the carrier so that the ends of the fingers are finally directed toward the shock former, as shown in Figs. 5, 9 and 10. During these movements of the carrier, the lever 192 has shifted so that the stud 200 is located in the offset portion 203 of the slot 201. The sheaf is now in position to be empaled upon the tines of the shock former. This is effected upon actuation of the packer 153. The packer is being operated simultaneously with operation of the carrier, through rotation of the crank-shaft 154. Upon rotation of the crank-shaft, the throw thereof moves the forked terminals 161 and 162 through the spaces between the fingers of the carrier so that the sheaf is engaged in the crotches thereof. Since the levers 163 are anchored to the links 164, the fork-like terminals have a reciprocatory or pitching motion with respect to the shock former so that upon release of the carrier, the sheaf gripped by the packer is moved into empaling relation with the tines and sloped in accordance with the position of the arms 62. The fingers of the carrier retain their grip on the sheaf until the sheaf has been engaged by the packer and moved to such a position that it will be stopped by the shock former. This is readily effected through the yielding action of the spring fingers 193. However, at this point the carrier begins its return movement by reason of return of the crank-arm 313 to its original position through the link 314. During movement of the bundle carrier toward the shock former, the arm 317 that is connected with the crank-shaft 213 passes the head 268", but on the return movement the arm 317 engages the head to move the lug 271 on the lever arm out of stopping engagement with the lug 263. The lug 263, however, will retain its position since it is engaged by the lug on the arm 262. Thus the movement of the lever arm 268 will have no effect on the clutch 254 at this time. The control lever 192 then shifts so that the stop shoulder 204 thereof engages the stud 200. The terminal arms 215 and 220 of the rocker arm 211 are now moving in reverse direction to that above described, so that a pushing influence is exerted by the link 222 and a pulling force by the rod 218. Stopped engagement of the control link 192 and the cooperating link 209 with the respective studs of the bracket now cause shifting of the levers 190 and arm 187—188 so that the fingers 183 and 193 of the carrier move to open position and remain in open position when the carrier reaches its original position in alignment with the discharge of the binder, ready to receive the succeeding sheaf.

After deposit of the sheaf on the tines of the shock former, the arm 57 on the upper end of the shaft 53 actuates the link 56 to swing the pawl 54 into engagement with the teeth 55 of the flange 50 thereby rotating the tube 49 in the collar 45 and advancing the shock former one space in the direction of the arrow (Fig. 9). As the arm 57 continues its movement, the link 56 is moved retractively to carry the pawl 54 over the teeth 55. The formed sheaves are successively deposited upon the shock former in juxtaposed contact until the first deposited sheaf engages the trip finger 294 just after deposit of the last sheaf on the shock former. The shock former is now completely packed and movement of the finger 294 effects actuation of the rod 299.

Since the bell-crank 247 has been moved out of the path of the lugs 252 and retained out of this position by the cam on the crank-arm 313, movement of the rod 299 causes a rocking movement of the shaft 267 and arm 266 to rock the bell-crank 260 through the link 265, whereby the arm 262 thereof is moved out of contact with the lug 263. If at this time the bundle carrier has completely effected deposit of the last shock and has started its return movement to receiving position, the lug 271 has also moved out of engagement with the lug 263 so that the clutch 254 is freed. The trip clutch is effective in rotating the shaft 240 through the driven connection thereof with the driving element of the other trip clutch 244. Consequently the shaft 240 now rotates so that the crank 88 reciprocates the pitman 86, thereby actuating the rocker arms 83 and 72 to raise the tube 49 of the shock former. This movement of the shock former collapses the arms 62 so that the tines are retracted through the openings 107 and 108 as shown in Fig. 5, freeing the shock so that it settles to the ground. Simultaneously the link 151, through the arm 150, rocks the shaft 149 to open the gates 115 and 116, as shown in Fig. 10, so that the shock is cleared of the parts of the shock former. Upon opening of the gates the arm 130 is actuated to stabilize the shock as it slips to the ground. As the crank 88 continues its rotation the rocker arms 83 and 72 are returned to their normal position restoring the shock former and closing the gates to reverse actuation of the respective levers.

It is thus obvious that I have provided a shocker wherein a shock is formed progressively with formation of the sheaves and that the shock is carried thereby until completely formed, after which it is automatically deposited on the ground. I find that the shock when thus formed is sufficiently strong to retain its shape and sheds moisture so that the grain is thoroughly protected while remaining in the shock.

There may be times when the operator may desire to clear a partially formed shock from the shock former. This may be effected by operating the lever 302 which oscillates the shaft 308 and hook 310, thereby rocking the arm 300 and accomplishing the same result as effected upon automatic engagement of a shock with the finger 294.

From the foregoing it is obvious that I have provided a shocker that is of simple construction and capable of positive operation under timing control of the sheaf forming mechanism of the binder.

What I claim and desire to secure by Letters Patent is:

1. A machine of the character described including a mobile frame, shock forming guide means including movable gates carried by the frame and hinged to swing rearwardly with respect to forward travel of the frame, sheaf empaling means, means for intermittently rotating the sheaf empaling means within said guide means, means for retracting the empaling means to deposit a shock formed of the empaled sheaves, means for releasing said gates, and a presser arm connected with one of the gates to press the shock on the side opposite said gates to support said shock.

2. A shocker including a mobile frame, a sheaf carrier, means movably supporting the sheaf carrier on the frame for movement from a substantially horizontal position with relation to the sheaf discharge of a binder to a substantially vertical position, a shock forming mechanism including a substantially cone-shaped collapsible core, empaling means on said core, a packer arranged to remove sheaves from said carrier when in vertical position and for moving the sheaves in empaling relation with said empaling means, means for effecting collapse of the core and withdrawal of said empaling means, and trip means arranged in the path of a sheaf on said core to actuate said collapsing means for releasing the sheaves from said core when a predetermined number of sheaves has been received.

3. A shocker including a mobile frame, a sheaf carrier, means movably supporting the sheaf carrier on the frame for movement from a substantially horizontal position with relation to the sheaf discharge of a binder to a substantially vertical position, a shock forming mechanism including a substantially cone-shaped collapsible core, retractible empaling means on said core, a packer arranged to remove sheaves from said carrier when in vertical position and to carry the sheaves in empaling relation with said retractible empaling means, means for effecting collapse of the core and withdrawal of said empaling means, trip means arranged in the path of a sheaf on said core to actuate said collapsing means for releasing the sheaves from said core when a predetermined number of sheaves has been received, and means independent of the sheaf engaging trip means to effect collapse of the core for releasing the shock when less than a predetermined number of sheaves has been deposited on said empaling means.

4. In an apparatus of the character described, a shock former including a substantially frustoconical outlet guide, gates forming one side of said guide, a tube, means reciprocably and rotatably supporting said tube in the axis of said guide, flexible arms carried by said tube, empaling devices carried by the tube and actuated by the flexible arms upon reciprocation of the tube, and means responsive to reciprocation of the tube for opening the gates.

5. A shocker including a mobile frame, a sheaf carrier, means movably supporting the sheaf carrier on the frame for movement from a substantially horizontal position with relation to the sheaf discharge of a binder to a substantially vertical position, a shock forming mechanism including a substantially collapsible core rotatable on the frame, empaling means on said core, a packer adapted to engage the sheaf moved by said carrier when the carrier is in vertical position and to move the sheath engaged thereby into empaling relation with said empaling means, trip means engageable by a sheaf on said core to effect collapse of the core and release of the sheaves from said core when a predetermined number of sheaves has been received in the shock forming mechanism, and rotating means for said core to bring said sheaf into contact with the trip means.

6. In a shocker, a frame, an actuating shaft journalled on the frame, a trip clutch on said actuating shaft, a driving member connected with the trip clutch, a sheaf carrier, a support on the frame for the sheaf carrier, means mounting the sheaf carrier on the support for movement in an arcuate path from a substantially horizontal position to a vertical position, a crank-shaft journalled on the frame, a rocker arm fixed to the crank-shaft, means connecting the rocker arm with the sheaf carrier to effect said arcuate movement upon actuation of the crank-shaft, a pinion on said actuating shaft, a gear meshing with the pinion, an eccentrically arranged pin on said gear, a pitman connecting said pin with the crank of said crank-shaft, and means for tripping said clutch to effect movement of the sheaf carrier.

7. In a shocker, a frame, a shock former on the frame, a sheaf carrier, a support on the frame for the sheaf carrier, means mounting the sheaf carrier on the support for movement in an arcuate path from a sheaf receiving position to a sheaf depositing position with respect to the shock former, a packer for removing sheaves from the sheaf carrier and depositing said sheaves in the shock former, an actuating shaft carried by the frame, a trip clutch on the actuating shaft, driving means for the trip clutch, a pinion on the actuating shaft, a gear meshing with the pinion and having operative connection with the packer, a pin eccentrically arranged on said gear, a pitman connected with said pin, a crank-shaft connected with the pitman, a rocker arm on the crank-shaft, means connecting the rocker arm with the sheaf carrier, and means for tripping said clutch to effect actuation of the sheaf carrier and operation of the packer.

8. In a shocker, a frame, a pair of actuating shafts on the frame, trip clutches on the respective shafts, driving means for the trip clutches, a shock former including a substantially collapsible and reciprocable core, a sheaf carrier arranged to carry sheaves to the shock former, a packer supported on the frame and movable to and from the shock former for moving sheaves from the sheaf carrier into said shock former and depositing the sheaves on said core, an operative connection between the sheaf carrier and packer and one of said shafts, means on the frame for reciprocating said core, a driving connection between the other of said shafts and said reciprocating means, and trip means connected with said clutches to trip the same for effecting actuation of the sheath carrier and packer and said reciprocating means.

9. In a shocker, a frame, a pair of actuating shafts on the frame, trip clutches on the respective shafts, driving means for the trip clutches, a shock former supported on the frame including a substantially collapsible and reciprocable core, a sheaf carrier on the frame for carrying sheaves from a receiving position to the shock former, a packer movable on the frame for moving sheaves from the sheaf carrier into said shock former and depositing the sheaves on said core, means operatively connecting the sheaf carrier and packer with one of said shafts, means for reciprocating said core, a driving connection between the other of said shafts and said reciprocating means, means for tripping said clutches, control means for the clutch operating said reciprocating means, and means actuated by a sheaf on the shock former and having connection with the control means for releasing said control means.

10. In a shocker, a sheaf carrier including a supporting shaft, a series of plate-like brackets on the supporting shaft, a pair of shafts journalled in said brackets, sheaf engaging fingers carried by said last named shafts, lever arms on said last named shafts, a link connecting the lever arms, an actuating arm on one of said shafts, a latch-like control lever connected with the actuating arm, latch means for said control lever, and means for selectively releasing the control lever from said latch means whereby said fingers are moved into gripping engagement with the sheaf.

11. In a shocker, a sheaf carrier including a supporting shaft, a series of plate-like brackets on the supporting shaft, a pair of shafts journalled in said brackets, sheaf engaging fingers carried by said last named shafts, lever arms on said last named shafts, a link connecting the lever arms, an actuating arm on one of said shafts, a latch-like control lever connected with the actuating arm, latch means retaining the control lever for holding said fingers in sheaf receiving position, means for selectively releasing the control lever from said latch means whereby said fingers are moved into gripping engagement with a sheaf, a support for the sheaf carrier, and means pivotally and rotatably mounting the sheaf carrier on the support.

12. In a shock former, a support, a collar carried on the support, a tubular body slidably supported in the collar, a plurality of flexible arms carried by the lower end of said tubular body, a reciprocatory shaft movable through the tubular body, stops on the shaft engageable with the tubular body, prongs carried by said shaft and movable through the flexible arms incidental to movement of the shaft relatively to the tubular body to distend and retract said prongs, a latch for connecting the shaft with the tubular body when the prongs are retracted, and means engageable with the collar for releasing said latch.

13. In combination with a binder, a shocker including a mobile frame, a shock former on said frame, a sheaf carrier, means offset laterally of the shock former for supporting the sheaf carrier on the frame in receiving relation with the binder, said supporting means being arranged to swing the sheaf carrier bodily from said receiving position to a vertical position in substantially parallel alignment with the shock former, and means on the frame and cooperating in timed relation with the carrier for removing a sheaf from the carrier and depositing the sheaf on the shock former.

14. An apparatus of the character described including a mobile frame, a shock former on said frame, a sheaf carrier, means supporting the sheaf carrier on the frame in a substantially horizontal position laterally and forwardly of the shock former, said sheaf carrier being mounted on said supporting means for bodily and rotative movement from said horizontal position to a vertical position forwardly of the shock former, and means movable to and from the shock former to engage a sheaf in the sheaf carrier for removing the sheaf and depositing the sheaf on the shock former.

15. In an apparatus of the character described, a mobile frame, a shock former including a body member and a plurality of flexible arms carried thereon, spreading means connected with the lower ends of the arms whereby said arms form a collapsible cone-like sheaf support, means rotatably mounting the shock former on the frame, a plurality of retractible tines carried by the shock former and projectable from said arms upon actuation of said spreading means, means arranged on the frame for empaling sheaves on said tines, means for intermittently rotating the shock former, and means for actuating said spreading means to effect projection and retraction of the tines.

16. A shocker including a wheeled frame, a shock former rotatable on the frame and having retractible tines, a sheaf carrier, means swingingly supporting the sheaf carrier on the frame for movement in an arc from a horizontal position to a substantially vertical position, and a packer on the frame movable to and from the shock former for moving a sheaf from the carrier into the shock former, said packer having angularly arranged terminals to engage sides of the sheaf for straightening the sheaf relatively to the rotational axis of the shock former before empaling the sheaf on said tines.

17. In an apparatus of the character described, a sheaf carrier including hinged fingerlike sections for grippingly engaging a sheaf, a support, a bracket, means pivotally mounting the bracket on the support about a horizontal axis, an arm connected with the sheaf carrier, means pivoting the arm on the bracket about an axis transversely of the horizontal axis, and means swinging the carrier on said pivotal axes for movement from a horizontal to a substantially vertical position including means for hingedly moving said finger-like sections to and from gripping support of a sheaf.

18. In a machine of the character described, a shock former including a substantially frusto-conical guide, a core reciprocable in the axis of said guide including a tubular body, a shaft extending through the tubular body, collars on the lower end of the shaft, a plurality of flexible arms fixed to the lower end of the tubular body, links connecting free ends of the arms with the lowermost collar, tines pivotally connected with an upper collar and projectable through openings in said arms, and reciprocating means for said shaft to effect spread of the arms by said links and projection of the tines through said openings.

19. In a machine of the character described, a shock former including a substantially frusto-conical guide, a core reciprocable in the axis of said guide including a tubular body, a shaft extending through the tubular body, collars on the lower end of the shaft, a plurality of flexible arms fixed to the lower end of the tubular body, links connecting free ends of the arms with the lowermost collar, tines pivotally connected with the other collars and projectable through openings in said arms, and reciprocating means for said shaft to effect spread of the arms by said links and projection of the tines through said openings, said upper collar being arranged to engage said tubular body to raise the tubular body when the shaft is reciprocated to effect collapse of said arms and retraction of said tines.

20. In a machine of the character described, a shock former including a substantially frusto-conical guide, a core reciprocable in the axis of said guide including a tubular body, a shaft extending through the tubular body, collars on the lower end of the shaft, a plurality of flexible arms fixed to the lower end of the tubular body, links connecting free ends of the arms with the lowermost collar, tines pivotally connected with the other collars and projectable through openings in said arms, reciprocating means for said shaft to effect spread of the arms by said links and projection of the tines through said openings, a ratchet ring fixed to the tubular body, and a ratchet oscillatable about the axis of the tubular body to rotate the tubular body when the tubular body is in position to align said ratchet ring with said ratchet.

PETER KETELSEN.